United States Patent [19]

Rupp

[11] Patent Number: 5,176,177
[45] Date of Patent: Jan. 5, 1993

[54] FIRE FIGHTER WATER MANIFOLD

[76] Inventor: Dean W. Rupp, 7414 Barclay Rd., Cheltenham, Pa. 19012

[21] Appl. No.: 752,084

[22] Filed: Aug. 29, 1991

[51] Int. Cl.$^5$ .............................................. F16K 51/00
[52] U.S. Cl. .............................. 137/883; 137/561 A; 285/150
[58] Field of Search ............................ 137/561 A, 883; 285/150; 169/16, 18

[56]     References Cited
        U.S. PATENT DOCUMENTS

| 1,750,485 | 3/1930 | Muller, Jr. | |
| 1,786,963 | 12/1930 | Schoenberger | 137/883 |
| 2,313,614 | 3/1943 | Boothman | 137/883 X |
| 2,418,808 | 4/1947 | Benson | 137/883 X |
| 2,598,961 | 6/1952 | Andrus | |
| 2,726,898 | 12/1955 | Henricksson | 137/883 |
| 3,400,732 | 9/1968 | Larrabee | 137/883 X |
| 3,516,638 | 6/1970 | Piggott | |
| 3,736,955 | 6/1973 | Schlesser | 285/150 X |
| 4,536,104 | 8/1985 | Bungert | |
| 4,549,567 | 10/1985 | Horton | |
| 4,890,648 | 1/1990 | Giordano | |
| 5,014,740 | 5/1991 | Cameron | |

FOREIGN PATENT DOCUMENTS 2155984  10/1985  United Kingdom ............... 137/883

Primary Examiner—Robert G. Nilson
Attorney, Agent, or Firm—Synnestvedt & Lechner

[57]     ABSTRACT

Fire hose manifolds and systems are provided by this invention which include a high pressure chamber having a large inlet opening and a plurality of small outlet openings therein. A first coupling means is provided for making fluid communication between the large inlet opening and a source of pressurized water, and a second coupling means is provided for making fluid connection between a portion of the outlet openings and a fluid conduit. The fire manifolds of this invention are light weight and include quick disconnect couplings for providing emergency access to a water source for the treatment of fires and hazardous material zones.

14 Claims, 2 Drawing Sheets

FIRE FIGHTER WATER MANIFOLD

FIELD OF THE INVENTION

This invention relates to water connections suitable for fire fighting applications, and more particularly, to manifolded systems for distributing water to hazardous material sites.

BACKGROUND OF THE INVENTION

Fire fighting units have increasingly been called upon to aid in the containment and clean-up of hazardous material sites (also referred to herein as "HAZMAT" areas or sites). Typically, HAZMAT area formats include a "hot zone" around the spill which is marked or roped off to contain the area. The hot zone is restricted to the entry team only and is accessible by a single entrance way, so that remnants from the spill on the boots and other personal protective equipment of the fire fighters can be contained properly. The hot zone is surrounded by a marked off "warm zone" which is restricted to other fire fighting personnel and members of the support crew. Bystanders are required to stand in a "cold-zone" which is marked off a safe distance from the potentially toxic effects of the spill.

In an effort to prevent the contamination of areas outside the hot zone, clean-up stations have been provided near the hot zone entryway so that the personal protective equipment of the fire fighter can be washed thoroughly, before he or she is permitted access to the warm zone. These shower stations have typically been supplied with water by standard fire fighting industry 1.5 inch fire hoses, which are usually reinforced and contain porous fabric exteriors that readily absorb contaminants. Once contaminated, these hoses must either be professionally cleaned or destroyed, both at great expense to the often limitedly funded fire company or municipality.

Accordingly, there is a need for a more inexpensive water supply system for providing required cleaning water to shower stations contained within the hot zone of HAZMAT decontamination areas. There is also a need for a more disposable and versatile conduit for supplying water to fire fighting applications.

SUMMARY OF THE INVENTION

This invention provides fire hose manifolds suitable for emergency implementation by fire fighters. These manifolds include a high pressure chamber having a large inlet opening and a plurality of small outlet openings therein. The large inlet opening is equipped with a first coupling means for selectively providing fluid communication to a source of pressurized water. A second coupling means is also provided for permitting fluid communication between a portion of the outlet openings and a fluid conduit.

Accordingly, the fire hose manifolds and systems of this invention provide efficient water distribution to fire fighters treating hazardous decontamination zones. A single device which is easily stored on a fire truck is provided for reducing a standard fire hose or fire hydrant into multiple garden hose outlets. The device is small enough for storage requirements, light weight, and configured so as to not waste hose length. It is also equipped with an adequate supply of outlets to provide simultaneous operation without substantial loss in operating pressure. The fire hose manifolds of this invention preferably reduce a standard size fire fighting hose into four, individually-controlled, quick connecting garden hose outlets. This produces a time- and money-saving operation in the set-up and break-down of hazardous material zones and personnel decontamination stations. The supply hose and manifold are designed to remain outside the contamination zone. This allows expensive fire hoses to remain clear of the contamination, while easier to maneuver and less expensive garden hoses are introduced into the contamination zone for entry team washdown operations. Accordingly, if the garden hose is contaminated, it is much easier and less costly to destroy and replace than cleaning or replacing the standard fire fighting hose.

In more detailed embodiments of this invention, a fire hose manifold system for emergency implementation in and around a hazardous material zone is provided. This system includes a high pressure chamber having an opening defined by a fire hose coupling and a plurality of outlet tubes extending from the high pressure chamber. The outlet tubes include individual connector couplings for connecting to at least one small hose. The small hose is designed to be used within the hot zone of the hazardous material area, so that expensive fire hose equipment is not contaminated.

BRIEF DESCRIPTION OF THE DRAWINGS

The accompanying drawings illustrate preferred embodiments of the invention as well as other information pertinent to the disclosure, and in which.

DETAILED DESCRIPTION OF THE INVENTION

Fire hose manifolds and manifold systems are provided by this invention which include high pressure chambers fluidly connected to first and second coupling means for providing both access to a fire hydrant or fire hose at an inlet end, and to one or more fluid conduits at an outlet end. As used herein the term "high pressure" includes pressures of about 5-90 psi, more preferably about 50-80 psi, and in certain applications, up to about 250 psi. Such pressures can conveniently be monitored with pressure gauges, preferably dials mounted on the manifold itself.

Figure 1:
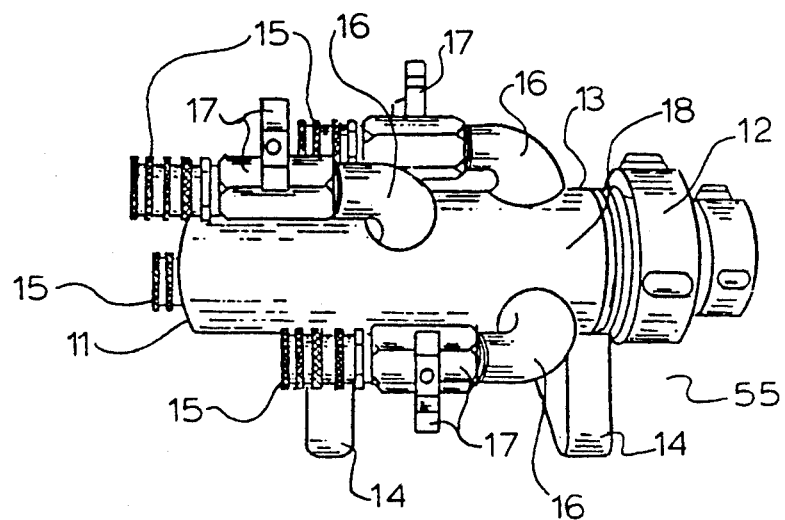
FIG. 1: is a side elevation view of a preferred fire hose manifold of this invention.
Figure 2:
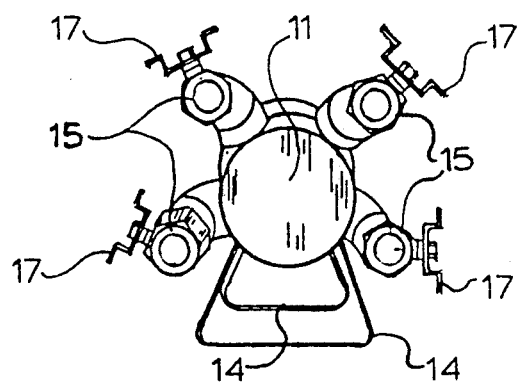
FIG. 2: is a elevation view of a preferred outlet end of the fire hose manifold of FIG. 1.
Figure 3:
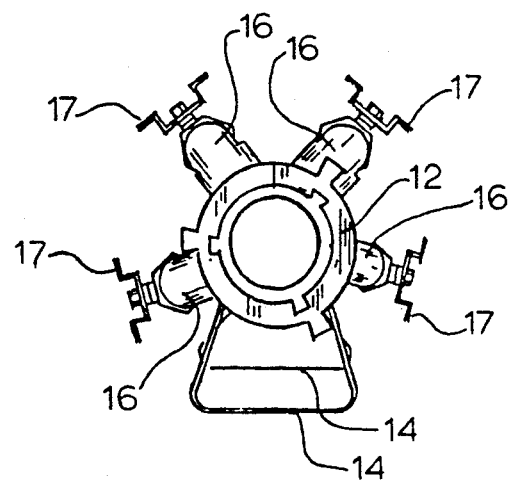
FIG. 3: is a elevation view of the preferred inlet end of the fire hose manifold of FIG. 1.

With reference to FIGS. 1-3 there is shown a preferred fire hose manifold 55 having a unique arrangement of fittings and valves for permitting emergency implementation by fire fighters during hazardous material contamination or other fire fighting tasks. The manifold 55 includes a high pressure chamber 13 having a large inlet opening and a plurality of small outlet openings.

The high pressure chamber 13 preferably includes a water- and rust-resistant body 18 capable of communicating with a high pressure water source. Acceptable materials for the body 18 include, for example, cast iron, stainless steel, bronze, brass, and high strength resins, such as epoxy and nylon. Such resins are typically reinforced with glass or other fibers. In the preferred embodiment described in FIG. 1, a 2.5 inch size, schedule 40 black iron pipe, having a length of about 10 inches is utilized for the body 18. This iron pipe is threaded at one end with a National Taper Pipe (NTP) thread. Preferably, the body 18 is capped with an end plug 11 made from the same material as the high pressure chamber. In the embodiment illustrated in FIG. 1, a 0.25 inch thick steel plate was employed.

At the inlet end of the high pressure chamber, a first coupling means is provided for fluid communication between the large inlet opening and a source of pressurized water. Preferably, this first coupling means comprises a swivelling, rocker lug inlet coupling 12. One preferred coupling mechanism is a Model No. 53 RL, 6061-T6 Aluminum Alloy, hardcoated coupling with a Higby cut. This coupling includes a 1.5 inch swivelling female, National Standard Thread (NH), and rocker lugs with mesh alignment mark, to rigid 2.5 inch female, Iron Pipe Thread (NPSH), rocker lugs. The rocker lugs permit the use of common hose coupling spanners. The Higby cut permits alignment of hose threads for instantaneous meshing. This coupling can be purchased from Redhead Brass, Inc., Shreve, Ohio.

In preferred embodiments, the high pressure chamber 13 is equipped with second coupling means which includes a plurality of outlet tubes, such as elbows 16 extending from the high pressure chamber 13 and having portions disposed generally axially with the high pressure chamber 13. Preferably, the elbows 16 are 0.75 inch NPT, 90°, schedule 40, black iron street elbows, available from ITT Grinnell.

The elbows 16 are preferably equipped with shut-off valves 17. Preferably, these shut-off valves 17 include individual valve controls, such as FIG. 1550 WH, bar stock ball valves made of brass and including a 90° operating range and 0.75 inch NPT inlets and outlets. These valves also include 0.49 inch diameter ball orifices, and a ball position indicating gull wing handle. These ball valves are considered large ball orifices for low pressure loss, and have renewable valve seals for long wear. The gull wing handles aid in keeping the design compact, but are easy to use. Such valves are available from ITT Grinnell.

Fitted to the outlet end of the shut-off valves 17 are preferred quick disconnect couplings 15. These couplings 15 are specially fitted to accommodate standard garden hose quick connect couplings for permitting extremely fast set-up and break-down. Preferably, the quick disconnect couplings include No. 09QC female GHT to female collars and ball retainer sockets having a male nipple to male GHT. They are preferably constructed of brass or copper and can be obtained from Gilmore, Somerset, Pa.

To support the body of the fire hose manifold 55, a support structure suitable for supporting the fire hose manifold 55 above a generally flat surface is provided. This support structure preferably includes a pair of stainless steel, or other suitable corrosion-resistant material, leg loops 14. In the preferred embodiment, 0.125 inch thick X inch wide stainless steel bars are bent in a triangular shape and then welded to the lower portion of the high pressure chamber 13.

The preferred fire hose manifold 55 is constructed by first welding the end plug 11 to the body 18, preferably with a 0.125 inch diameter, flux-coated, stainless steel, E316L welding wire, although Tungsten or Metal Inert Gas welding would also be suitable. The inlet swivelling, rocker lug coupling 12 is then threaded, preferably with Teflon ® ribbon, onto the threaded portion of the body 18. The elbows 16 are then welded onto the body 18 in communication with the apertures through the side wall of the body and the shut-off valves 17 are threaded with ribbon to pipe-to-coupling adapters, which are, in turn, threaded to quick disconnect couplings 15 on each elbow 16. The leg loops 14 are then welded by known techniques to the bottom of the body 18 to provide a suitable stand.

The surfaces of the fire hose manifold 55 are preferably coated to further reduce the incidence of corrosion. The exterior finish preferably includes two coats of cold galvanizing gray primer paint. A suitable product is Demkote 2W013B, from Dayton Electric Manufacturing Company, Chicago, Ill. Following the cold galvanizing paint coat, an all purpose gray primer coat is then applied, preferably Paint No. 1318 from Borden, Inc., Department HPPG-Krylon, Columbus, Ohio. In keeping with standard fire fighting colors, two coats of Cherry Red No. 2101 are then applied as an exterior surface finish. This paint product is also offered by Borden, Inc.

The interior of the body and elbow are preferably coated with one or more coats of white Color Guard Rubber Coating No. 81925, available from Permatex Industrial Corporation, 10 Tower Lane, Avon Park South, Avon, Conn.

Figure 4:
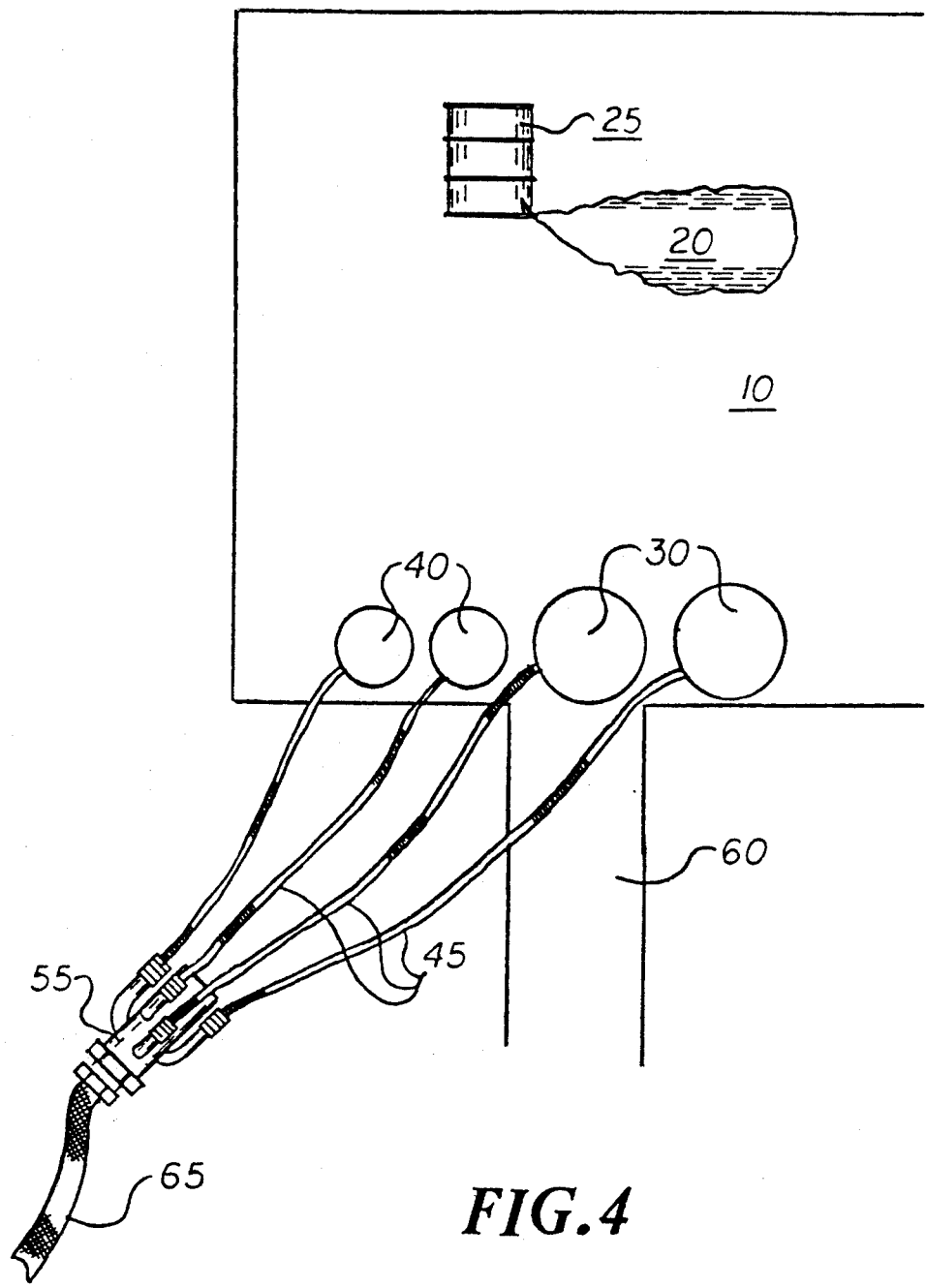
FIG. 4: is a schematic view of a preferred fire hose manifold being employed in a hazardous material zone.

The fire hose manifolds of this invention are ideally suited for hazardous material decontamination applications. With reference to FIG. 4, there is shown a HAZMAT area having a hot zone 10 and warm zone 50. The hot zone is designated and marked off for the entry team only and contains the region proximate to the spill, for example, toxic liquid 20 leaking from barrel 25. The hot zone may contain a plurality of shower stalls 30 and personal protective equipment cleansing pools 40. The purpose of these personnel decontamination sites is to cleanse the personal protective equipment of the fire fighters prior to their exit through the single passageway 60.

As described in FIG. 4, the manifold 55 can be equipped with a plurality of garden hoses 45. Such garden hoses typically include brass fittings, and preferably include a quick disconnect type coupling, and inexpensive polymeric conduit or tubing, which is preferably reinforced to accept higher pressures. These garden hoses can be connected quickly through the quick disconnect couplings 15 and then introduced into the hot zone to provide water to the personal protective equipment cleansing pools 40 or shower stalls 30. Similarly, these garden hoses can be fitted to a water jet nozzle or gun for cleaning the spill 20. Ideally, the inlet end or the rocker lug inlet coupling 12 of the manifold 55 is harnessed to a standard 1.5 inch durable lightweight fire hose which is mounted to a fire hose pumper on the fire truck.

Although hazardous material zones are illustrated, the manifold 55 of this invention could equally be employed for standard fire fighting duties, for example, cleaning smoke contaminated personal protective equipment of fire fighters during a routine fire containment operation, or providing cooling or flame quenching water through standard garden hoses for typical fire fighting applications. Although these uses are envisioned, the cost efficiency associated with converting the standard light-weight fire hoses to garden hoses is most apparent in HAZMAT applications.

From the foregoing, it can be understood that this invention provides manifold systems, suitable for many fire fighting applications, which are especially suited to the treatment and containment of hazardous material zones. These manifolds are light-weight, weighing less than 20 pounds, and preferably about 11 pounds, and are linearly designed so that the inlets and outlets are in substantially a straight line to save hose length and prevent kinking. Small diameter gardentype hoses can quickly be connected to these manifolds, without a significant loss in operating pressure, and thereafter individually controlled with individual shut off valves.

Although various embodiments have been illustrated, this was for the purpose of describing, but not limiting, the invention. Various modifications, which will become apparent to one skilled in the art, are within the scope of this invention described in the attached claims.

What is claimed is:

1. A fire hose manifold suitable for emergency implementation by a fire fighter, comprising:
    a horizontally disposed cylindrical high pressure chamber having a large inlet opening and a plurality of independently regulated small outlet tubes extending from said chamber and disposed radially around a central axis of said chamber, said outlet tubes having outlet portions which are substantially parallel with said central axis;
    first coupling means for selectively providing fluid communication between said large inlet opening and a source of pressurized water;
    second coupling means for selectively providing fluid communication between a portion of said outlet tubes and a fluid conduit; and
    support means for supporting said chamber and outlet portions substantially horizontally above a flat surface.

2. The fire hose manifold of claim 1, wherein said source of pressurized water comprises a fire hydrant or fire hose.

3. The fire hose manifold of claim 1, wherein said first coupling means comprises a swivelling, rocker lug inlet coupling.

4. The fire hose manifold of claim 3, wherein said coupling is sized to accept a standard National Standard Thread fire hose.

5. The fire hose manifold of claim 1, wherein said high pressure chamber comprises a first coupling threaded to a first end and a capped portion fitted to a second end.

6. The fire hose manifold of claim 5, wherein said outlet tubes comprise quick disconnect couplings.

7. The fire hose manifold of claim 6, comprising four outlet tubes.

8. The fire hose manifold of claim 7, wherein each of said outlet tubes comprise at least one shut off valve.

9. A fire hose manifold weighing less than 20 lbs. and suitable for emergency implementation by fire fighters, comprising:
    a horizontally disposed, high pressure cylinder having a large inlet opening and a plurality of small outlet openings therein;
    a first coupling for selectively providing fluid communication between said large inlet opening and a fire hose or fire hydrant;
    a plurality of small outlet tubes extending from said plurality of small outlet openings, each of said outlet tubes comprising a quick disconnect coupling and a shut off valve for connecting said high pressure chamber to a small hose, said outlet tubes comprising curved elbow portions having outlet portions disposed substantially parallel with said high pressure cylinder;
    support means for supporting said cylinder and outlet portions substantially horizontally above a flat surface.

10. A fire hose manifold, comprising:
    a horizontally disposed, cylindrical, high pressure chamber having a large inlet opening defined by a swivelling, rocker lug inlet coupling;
    a plurality of outlet tubes extending radially from said chamber and curved to provide outlet portions disposed substantially parallel with said chamber, each of said outlet tubes comprising a quick disconnect coupling for connecting to a standard garden hose; and
    support means for supporting said chamber substantially horizontally above a flat surface.

11. A hazardous material zone manifold system for emergency implementation by a fire fighter, comprising:
    a horizontally disposed, high pressure chamber having an opening defined by a fire hose swivelling, rocker lug coupling and a plurality of outlet tubes extending radially from said chamber and curved to provide outlet portions disposed substantially parallel with said chamber; said outlet tubes comprising individual connector couplings;
    at least one small hose connected to one of said connector couplings of said outlet tubes, said hose having an outlet within a hot zone of said hazardous material area; and
    support means for supporting said chamber and outlet portions substantially horizontally above a flat surface.

12. The fire hose manifold system of claim 11 further comprising a shower stall fitted to an outlet end of said small hose.

13. The fire hose manifold system of claim 11 further comprising a plurality of garden hoses connected to said connector couplings of said outlet tubes.

14. The fire hose manifold system of claim 13, wherein one of said garden hoses is fitted to a personal protective equipment washing pool within said hot zone of a hazardous material zone.

* * * * *